(12) United States Patent
Zhao

(10) Patent No.: US 6,525,513 B1
(45) Date of Patent: Feb. 25, 2003

(54) SOFT SWITCHING TOPOLOGICAL CIRCUIT IN BOOST OR BUCK CONVERTER

(75) Inventor: Linchong Zhao, Nanshan (CN)

(73) Assignee: Emerson Network Power Co., Ltd., Shenzhen (CN)

( * ) Notice: Subject to any disclaimer, the term of this patent is extended or adjusted under 35 U.S.C. 154(b) by 0 days.

(21) Appl. No.: 09/446,638

(22) PCT Filed: Feb. 5, 1999

(86) PCT No.: PCT/CN99/00014
§ 371 (c)(1),
(2), (4) Date: Jun. 15, 2000

(87) PCT Pub. No.: WO99/56384
PCT Pub. Date: Nov. 4, 1999

(51) Int. Cl.[7] .................................................. G05F 1/613
(52) U.S. Cl. ........................ 323/222; 323/225; 323/272
(58) Field of Search ................................. 323/222, 225, 323/271, 272, 282, 351

(56) References Cited

U.S. PATENT DOCUMENTS

| 5,815,386 | A | * | 9/1998 | Gordon | 323/225 |
| 5,914,587 | A | * | 6/1999 | Liu | 323/225 |
| 6,023,158 | A | * | 2/2000 | Liu | 323/351 |
| 6,051,961 | A | * | 4/2000 | Jang et al. | 323/271 |
| 6,060,867 | A | * | 5/2000 | Farrington et al. | 323/222 |
| 6,236,191 | B1 | * | 5/2001 | Chaffai | 323/225 |

FOREIGN PATENT DOCUMENTS

| CN | 1106588 A | 8/1995 | H02M/7/538 |
| CN | 1168021 A | 12/1997 | H02M/1/00 |
| CN | 1175123 A | 3/1998 | H03C/3/00 |
| CN | 2281038 Y | 5/1998 | H02M/3/28 |

* cited by examiner

Primary Examiner—Jeffrey Sterrett
(74) Attorney, Agent, or Firm—Morrison & Foerster LLP

(57) ABSTRACT

The invention relates to a soft switching topological circuit. A zero voltage turn-on is realized when the main switch is turned on, by utilizing the resonance of the resonant inductor and the resonant capacitor after the auxiliary switch is turned on. Moreover, during the turn-off of the main switch, the resonant inductor withstands a voltage drop, which causes the energy-feed device corresponding to the auxiliary switch to feed no energy out when the auxiliary switch is turned on, thereby realizing zero current turn-on of the auxiliary switch, and increasing the circuit running efficiency.

21 Claims, 15 Drawing Sheets

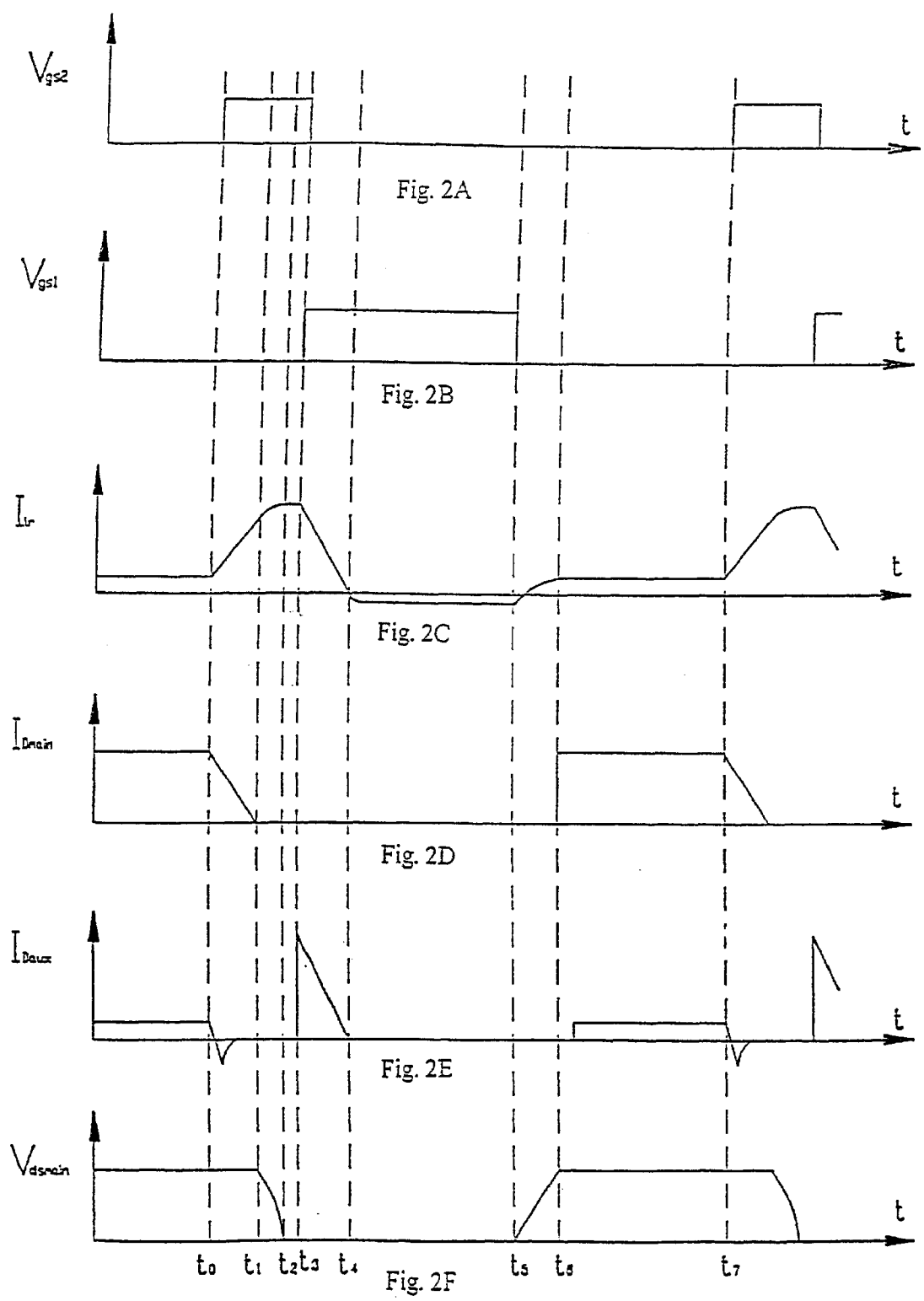
(PRIOR ART)

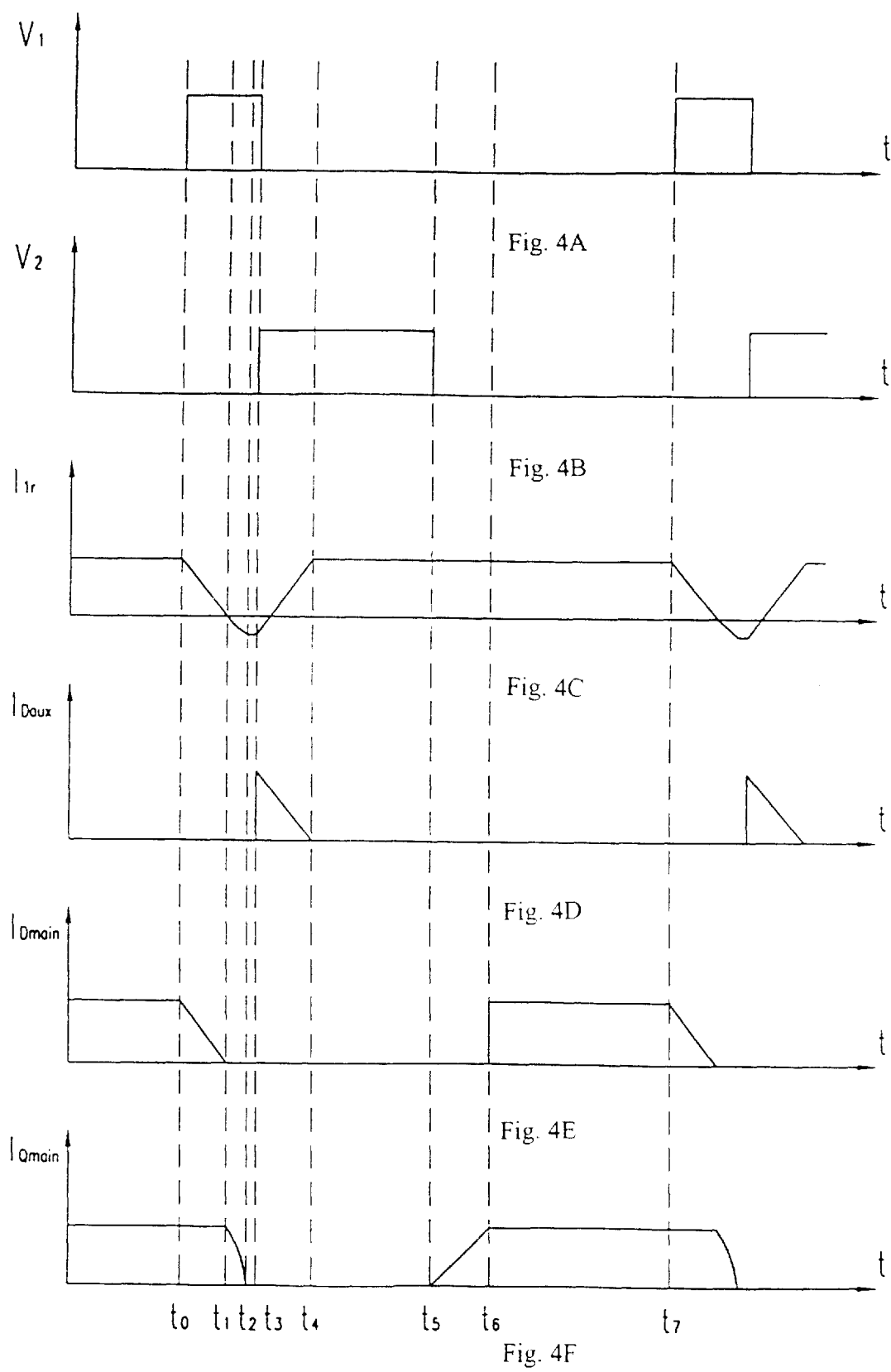

US 6,525,513 B1

SOFT SWITCHING TOPOLOGICAL CIRCUIT IN BOOST OR BUCK CONVERTER

TECHNICAL FIELD OF THE INVENTION

The invention relates to a soft switching topological circuit, more particularly to a soft switching topological circuit in a boost or buck converter circuit and a bridge circuit.

BACKGROUND OF THE INVENTION

The prior art working procedures of a ZVT-BOOST circuit are shown as in FIGS. 2A–2F. FIG. 2A shows the waveform of the gate driving signal voltage $V_{gs2}$ of the auxiliary MOSFET 106; FIG. 2B shows the waveform of the gate driving signal voltage $V_{gs1}$ of a main MOSFET 103; FIG. 2C shows the waveform of the current $I_{lr}$ in resonant inductor 105; FIG. 2D shows the waveform of current $I_{Dmain}$ of main ultrafast recovery diode 107; FIG. 2E shows the waveform of the current $I_{Daux}$ of auxiliary ultrafast recovery diode 108; FIG. 2F shows the waveform of the voltage $V_{dsmain}$ between the source and the drain of main MOSFET 103. It can be seen from the above drawings:

When t=t0, auxiliary MOSFET 106 is turned on, since the current flowing through an inductor, can not change abruptly, so, when auxiliary MOSFET 106 is turned on, the current in resonant inductor 105 increases gradually from an initial value, therefore the current flowing through main ultrafast recovery diode 107 decreases, and gradually to zero, thereby a soft turn-off of main ultrafast recovery diode 107 is realized by means of resonant inductor 105;

It can be seen from FIG. 2D, at the moment t=t1, the forward current of main ultrafast recovery diode 107 reduces to zero smoothly, thereby realizing a soft turn-off of main ultrafast recovery diode 107;

After the soft turn-off of main ultrafast recovery diode 107, resonant inductor 105 resonates with resonant capacitor 104, as shown in FIG. 2F, at the moment t=t2, when the voltage on resonant capacitor 104 resonates to zero, i.e., the voltage $V_{dmain}$ between the drain and source of main MOSFET 103 is also zero, the parasitic diode of main MOSFET starts turn-on and freewheel.

During the freewheeling period of the parasitic diode of main MOSFET 103, at the moment t=t3, main MOSFET is turned on while auxiliary MOSFET 106 is turned off, thus, realizing a zero voltage turn on of main MOSFET 103, at this moment, the stored energy in resonant inductor 105 is fed into output filter capacitor 109 through auxiliary ultrafast recovery diode 108, since the voltage between the drain and source of auxiliary MOSFET 106 is limited by the voltage Vo on output filter capacitor 109 through auxiliary ultrafast recovery diode 108, thereby also realizing a voltage clamping of auxiliary MOSFET 106 when it is turned off;

As shown in FIG. 2E, at the moment t=t4, the stored energy in resonant inductor 105 is completely released, i.e. the current flowing through auxiliary ultrafast recovery diode 108 is reduced smoothly to zero, and a soft turn-off of auxiliary ultrafast recovery diode 108 is realized, At the moment t=t5, main MOSFET 103 is turned off, resonant capacitor connected in parallel to main MOSFET 103 accomplishes a zero voltage turn-off of main MOSFET 103 as shown in FIG. 2F; along with the rise of the voltage $V_{dsmain}$ between the drain and source of main MOSFET 103, voltage $V_{dsaux}$ between the drain and source of auxiliary MOSFET 106 will also rise due to the resonance of resonant inductor 105 and the output parasitic capacitor of auxiliary MOSFET 106, and the current flowing through resonant inductor 105 also rises resonantly, as shown in FIG. 2C;

At the moment t=t6, when the voltage $V_{dsaux}$ between the drain and source of auxiliary MOSFET 106 equals the voltage on output filter capacitor 109, i.e. equals to the voltage Vo on load resistor 110, the current in resonant inductor 105 will flow to the output filter capacitor 109 through auxiliary ultrafast recovery diode 108, while at this moment main ultrafast recovery diode 107 is turned on, thus the voltage drop withstood on resonant inductor 105 is zero, it can be seen according to $V=Lr \cdot di/dt=0$, the current flowing through resonant inductor 105 remains unchanged until auxiliary MOSFET 106 is turned on, therefore, at the moment t=t7, when auxiliary MOSFET 106 is turned on again periodically, it is a non-zero current turn-on.

The converter circuit has been disclosed in China Patent Application CN 95190525.2. The circuit diagrams and the working procedures are shown in FIGS. 1 and 2. When the circuit is at the moment t=t6, and the voltage $V_{dsaux}$ between the drain and source terminal of an auxiliary MOSFET 106 equals the voltage on an output filter capacitor 109, i.e. the voltage Vo on load resistor 110, the current of resonant inductor 105 flows to output filter capacitor 109 through auxiliary ultrafast recovery diode 108, but at this time, main ultrafast recovery diode 107 is turned on, therefore, the voltage drop of resonant inductor 105 is zero, it can be seen from $V=Lr \cdot di/dt=0$ that before auxiliary MOSFET 106 is turned on, the current flowing through the resonant inductor 105 remains unchanged so, therefore at the moment t=t7, when auxiliary MOSFET 106 is turned on again periodically, it is a nonzero current turn-on.

Due to the above reason, the turn-on of auxiliary MOSFET 106 at the moment t=t0 is a non-zero current turn-on, thereby resulting in a fact that the turn-off of auxiliary ultrafast recovery diode 108 at t=t0 is a hard turn-off, so the turn-on loss of auxiliary MOSFET 106 and the turn-off loss of the corresponding auxiliary ultrafast recovery diode 108 are relatively large.

SUMMARY OF THE INVENTION

The invention gives out an improved ZVT power converter circuit, through which the drawbacks of the abovementioned invention can be overcome, thus realizing a zero-current turn-on for the auxiliary MOSFET and a soft turn-off for auxiliary ultrafast recovery diode.

A basic principle on the invention is to utilize the resonance of a resonant inductor and a resonant capacitor after the auxiliary switch is turned on to realize a zero-voltage turn-on for the main switch. What is more important is that the energy feed device has no energy feed-out when the auxiliary switch is turned on, thereby achieving a zero current turn-on for the auxiliary switch, and the circuit running efficiency is raised.

The invention includes the following circuit, which comprising: a main switch, an auxiliary switch, a freewheel diode in parallel with the main switch, a resonant capacitor, a current source, a resonant inductor, a main diode, an energy-feed device and a voltage source. In which the resonant capacitor is connected to the main switch in parallel, the main and auxiliary switches are turned on and off periodically, at the same time when the auxiliary switch is turned off, the main switch is turned on simultaneously, but the auxiliary switch is not turned on until the main switch is turned off for a period of time. In the boost converter circuit, said current source and said auxiliary switch form a loop, wherein the cathode of said main diode is connected to the positive electrode of said voltage source to form a serial branch, which is connected in parallel to said main switch; in the buck converter circuit, said voltage source, main switch and main diode form a loop, wherein the negative electrode of said voltage source is connected to the anode of the main diode, the current source is connected in parallel to the serial branch formed by the main diode and said resonant inductor. In these two converters, the resonant inductor is inserted between the current source and the connecting point of the main diode and said main switch, said auxiliary switch is connected in parallel to the serial branch formed by said resonant inductor and said main switch, said energy-feed device feeds out the residual energy of the resonant inductor when said auxiliary switch is turned off, and meanwhile feeds out the energy of the current source.

The basic principle on the invention is to utilize the resonance of a resonant inductor and a resonant capacitor after the auxiliary switch is turned on to realize a zero-voltage turn-on for the main switch. What is more important is that the energy feed device has no energy feed-out when the auxiliary switch is turned on, thereby achieving a zero current turn-on for the auxiliary switch, and the circuit running efficiency is raised.

The task of the invention is solved through the following circuit, which comprising: a main switch, an auxiliary switch, a freewheel diode in parallel with the main switch, a resonant capacitor, a current source, a resonant inductor, a main diode, an energy-feed device and a voltage source. In which the resonant capacitor is connected to the main switch in parallel, the main and auxiliary switches are turned on and off periodically, at the same time when the auxiliary switch is turned off, the main switch is turned on simultaneously, but the auxiliary switch is not turned on until the main switch is turned off for a period of time. In the boost converter circuit, said current source and said auxiliary switch form a loop, wherein the cathode of said main diode is connected to the positive electrode of said voltage source to form a serial branch, which is connected in parallel to said main switch; in the buck converter circuit, said voltage source, main switch and main diode form a loop, wherein the negative electrode of said voltage source is connected to the anode of the main diode, the current source is connected in parallel to the serial branch formed by the main diode and said resonant inductor. In these two converters, the resonant inductor is inserted between the current source and the connecting point of the main diode and said main switch, said auxiliary switch is connected in parallel to the serial branch formed by said resonant inductor and said main switch, said energy-feed device feeds out the residual energy of the resonant inductor when said auxiliary switch is turned off, and meanwhile feeds out the energy of the current source.

The energy-feed device of the invention can be a diode, i.e. an auxiliary diode, and the auxiliary diode is connected in parallel to a serial branch formed by the resonant inductor and the main diode.

The above resonant capacitor can be a parasitic capacitor of said main switching device, said freewheel diode may be an inverse-parallel diode or a parasitic diode of the main switching device.

The circuit of the invention ensures that the auxiliary diode is definitely cut off before the auxiliary switch is turned on, thus ensuring a zero current turn-on of the auxiliary switch, and also avoiding the hard turn-off of the auxiliary diode, and raising the circuit efficiency. However, the auxiliary switch is still a hard turn-off.

To solve the hard turn-off problems of auxiliary switch, a lossless snubber diode and a lossless snubber capacitor can be added in the above-mentioned circuit. Wherein the lossless snubber diode is connected in series to said auxiliary diode, and the serial branch thus formed is connected in parallel to a serial branch formed by said resonant inductor and main diode, and said lossless snubber capacitor is across the connecting point of said lossless snubber diode and said auxiliary diode and the connecting point of said resonant inductor and the main diode.

The circuit realizes a zero current turn-on and zero voltage turn-off of the auxiliary switch, and further increases the efficiency of the circuit.

BRIEF DESCRIPTION OF DRAWINGS

The invention will be described in detail via embodiments in conjunction with drawings as follows, in these drawings identical or similar portions are represented by identical symbols.

FIGS. 2A–2F show the working procedures of a prior art ZVT-BOOST circuit;

FIGS. 4A–4F show the working procedures of an application in a BOOST circuit of the invention;

DETAILED DESCRIPTION OF THE INVENTION

Figure 1:
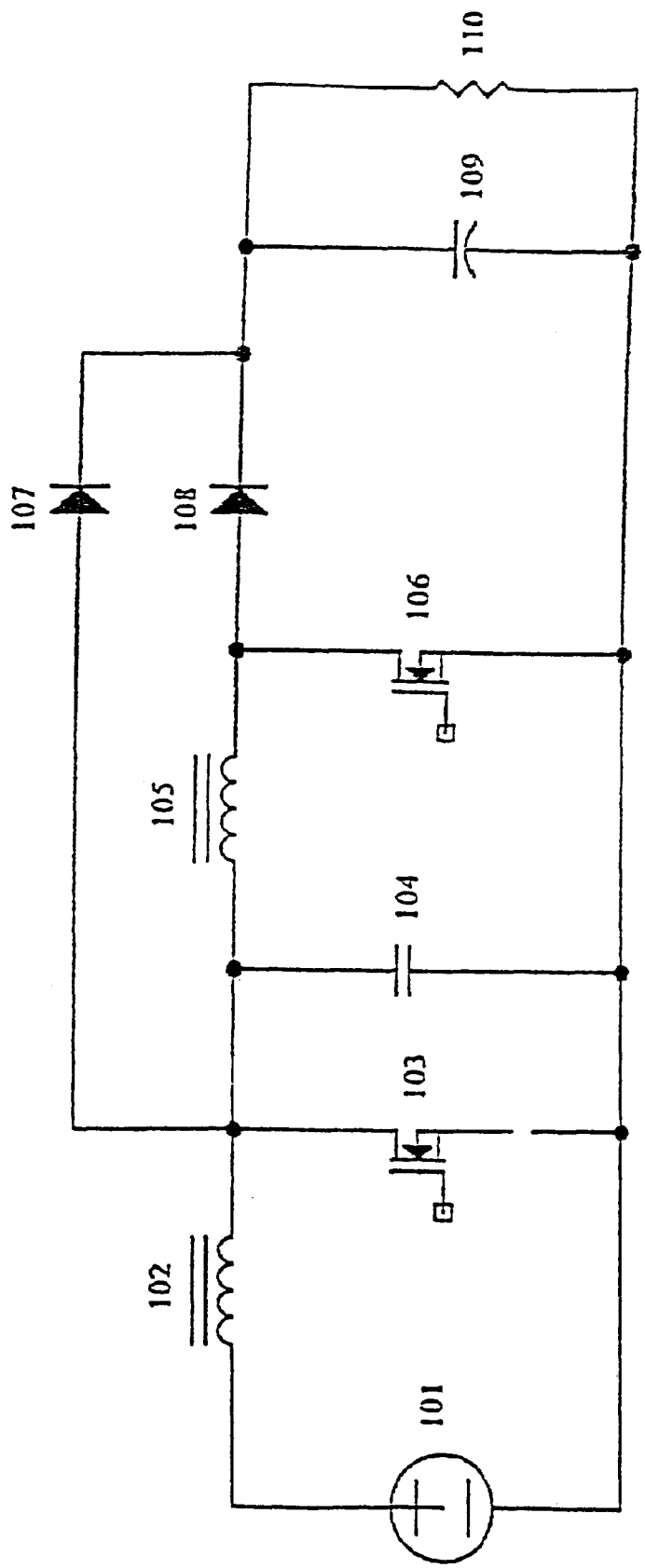
FIG. 1 is a topology of a prior art ZVT-BOOST circuit.
Figure 3A:
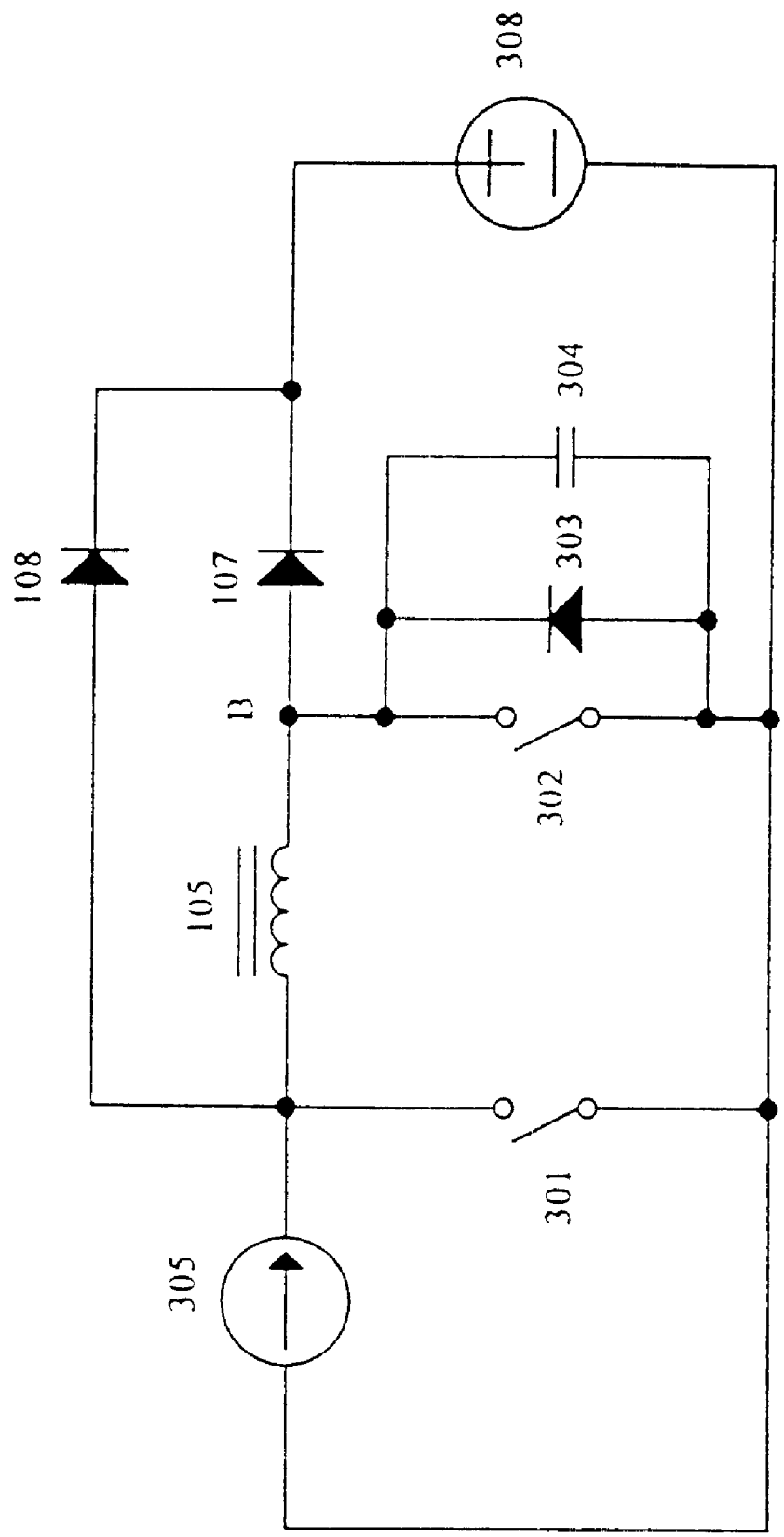
FIGS. 3A–3D show the topological structure view of the circuit of the present invention.
Figure 3B:
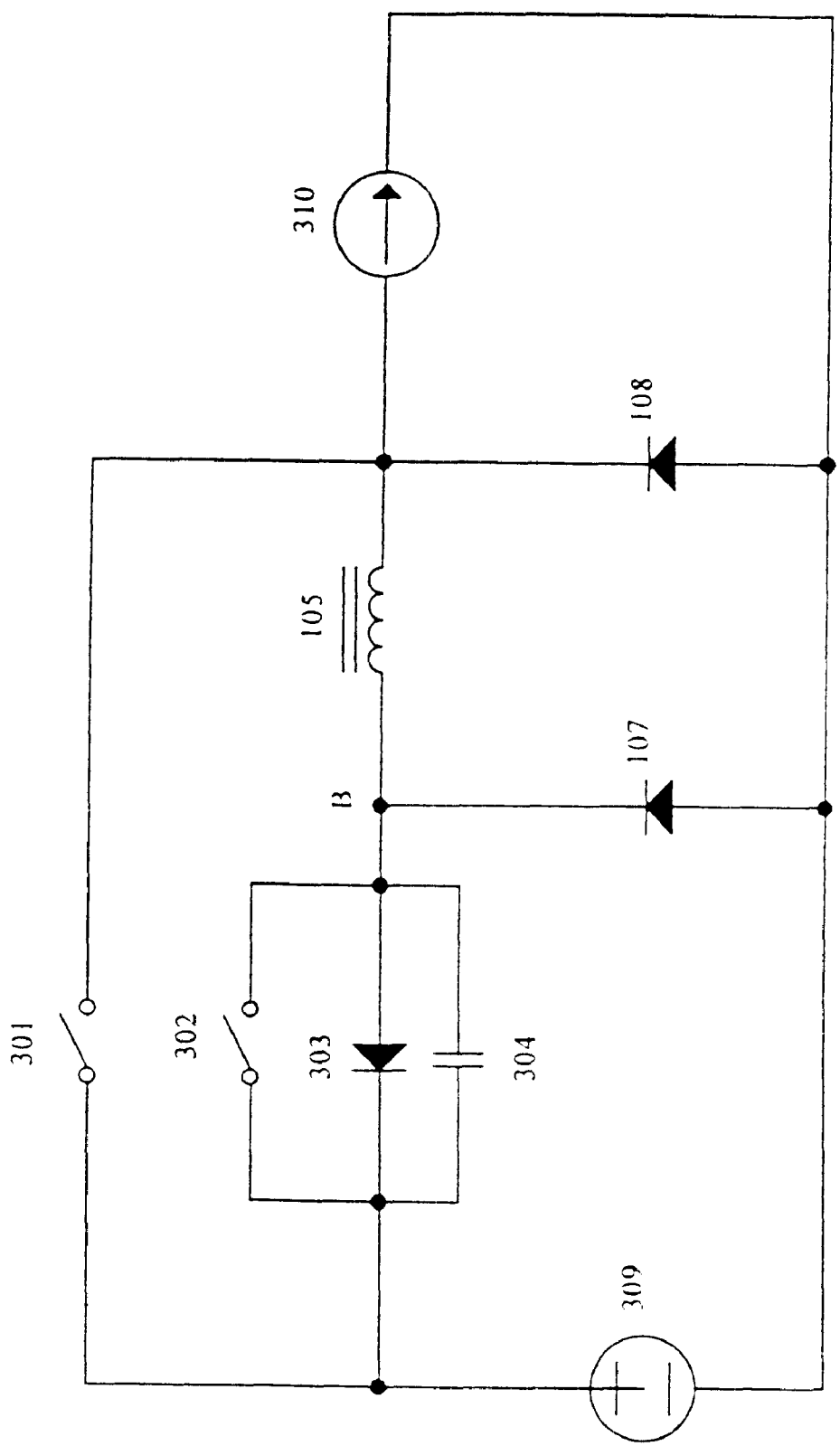
Figure 3C:
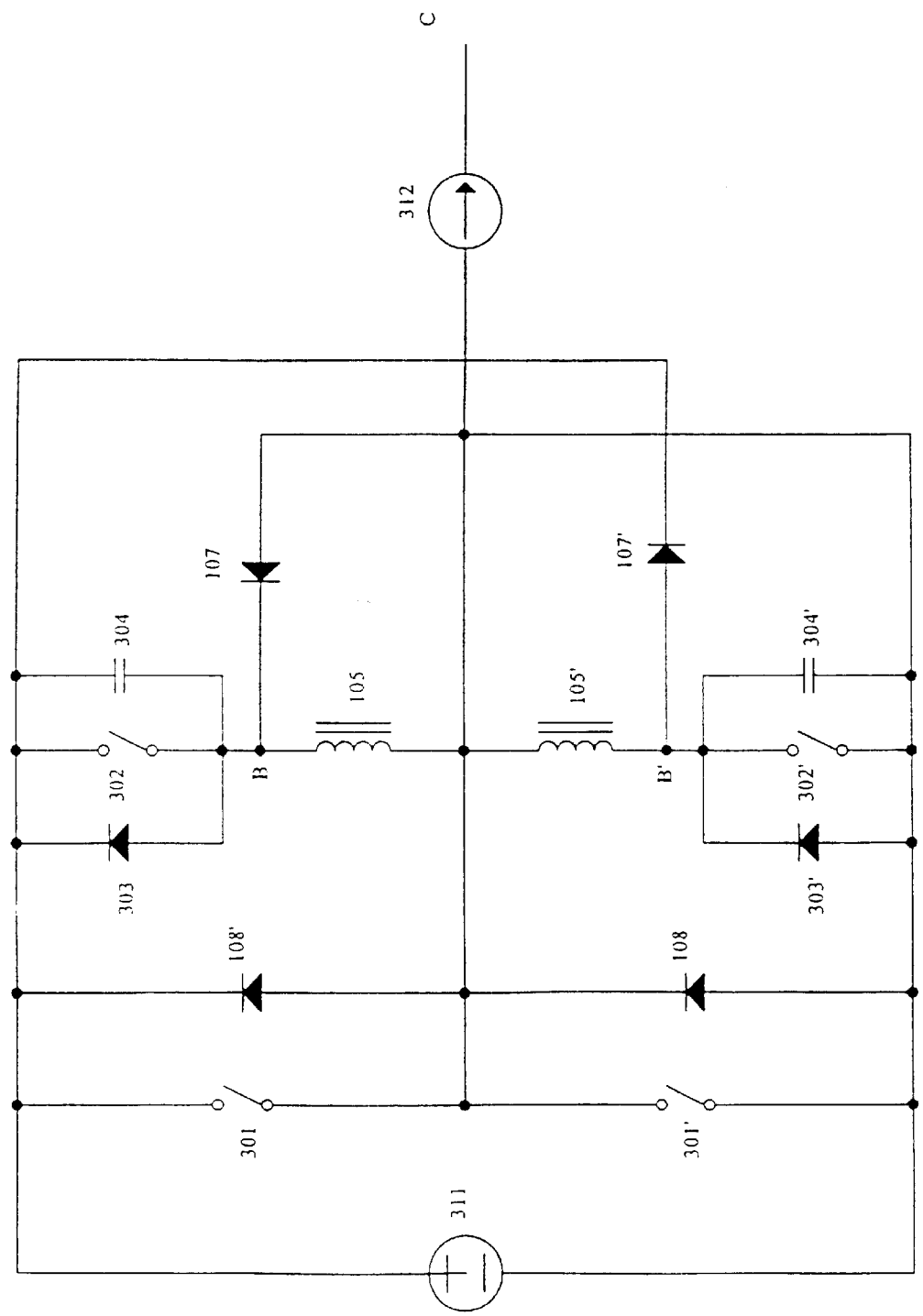

A circuit topological structure of the invention is shown in FIG. 3, where FIGS. 3A–3C are several connecting modes of the invention, which are applied in various circuits.

FIG. 3A is a topological structure applied in a BOOST circuit, current source 305, resonant inductor 105, main diode 107 and a first voltage source 308 are connected in order to form a main circuit, and other parts of the circuit are connected as the description for a scheme of the invention. The topological circuit includes current source 305, main switch 302, main diode 107, auxiliary switch 301, auxiliary diode 108, resonant inductor 105, resonant capacitor 304, freewheel diode 303, and first voltage source 308, wherein current source 305, resonant inductor 105, main diode 107, first voltage source 308 are connected in order to form a serial loop; and the positive electrode of current source 305 is connected to one end of resonant inductor 105, and the other end of the inductor is connected to the anode of main diode 107. The cathode of main diode 107 is connected to the positive electrode of first voltage source 308. Auxiliary switch 301 is connected in parallel to current source 305. The anode of auxiliary diode 108 is connected to the positive electrode of current source 305, and the cathode of auxiliary diode 108 is connected to the positive electrode of first voltage source 308. Main switch 302 is connected across the anode of main diode 107 and the negative electrode of first voltage source 308. Resonant capacitor 304 and freewheel diode 303 are in parallel with a main switch 302, wherein the cathode of the freewheel diode is connected to the anode of main diode 107.

FIG. 3B is a topological structure applied in BUCK circuit. Voltage source 309, main switch 302, resonant inductor 105, and current source 310 are connected in order to form a main loop, other portions of the circuit are connected as the description for the scheme of the invention. The topological circuit consists of voltage source 309, main switch 302, main diode 107, auxiliary switch 301, auxiliary diode 108, resonant inductor 105, resonant capacitor 304, freewheel diode 303, and current source 310, Wherein main diode 107, resonant inductor 105 and current source 310 are connected in order to form a serial loop, and the cathode of main diode 107 is connected to one end of resonant inductor 105, and the other end of inductor 105 is connected to the negative electrode of current source 310. Auxiliary diode 108 is in parallel with current source 310, wherein the cathode of auxiliary diode 108 is connected to the negative electrode of current source 310. A serial branch formed by freewheel diode 303 and voltage source 309 is in parallel with main diode 107, wherein the anode of freewheel diode 303 is connected to the cathode of main diode 107, and the cathode of freewheel diode 303 is connected to the positive electrode of the voltage source 309. Both main switch 302 and resonant capacitor 304 are in parallel with freewheel diode 303. Auxiliary switch 301 is connected across the positive electrode of voltage source 309 and the cathode of auxiliary diode 108.

FIG. 3B can be further improved. To be illustrated, a lossless snubber diode (307) is included between the auxiliary diode (108) and the current source (310), wherein the cathode of the lossless snubber diode (307) is connected to the anode of the auxiliary diode (108), and the anode of the lossless snubber diode (307) is connected to the positive electrode of the current source (310); a lossless snubber capacitor (306) is included, one end of the capacitor is connected to the cathode of the main diode (107), the other end of the capacitor is connected to the connecting point between the auxiliary diode (108) and the lossless snubber diode (307).

FIG. 3C is a topological structure of an arm of a bridge circuit when it is applied in the bridge circuit, one arm can be regarded as a combination of a BOOST circuit and a BUCK circuit, wherein, a voltage source 311, the first of main switches 302, the first of resonant inductors 105, current source 312, the first of resonant capacitors 304, the first of freewheel diodes 303, the first of auxiliary switches 301, the first of auxiliary diodes 108, and the first of main diodes 107 form a BUCK circuit; current source 312, the second of resonant inductors 105', the second of main diodes 107', voltage source 311, the second of main switches 302', the second of resonant capacitors 304', the second of freewheel diodes 303', the second of the auxiliary switches 301', and the second of auxiliary diodes 108' form a BOOST circuit, both circuits share a current source 312 and a voltage source 311 to form an arm in the bridge circuit.

The topological circuit consists of voltage source 311, the first of auxiliary switches 301, the second of the auxiliary switches 301', the first of auxiliary diodes 108, the second of the auxiliary diodes 108', the first of main switches 302, the second of main switches 302', the first of resonant inductors 105, the second of the resonant inductors 105', the first of resonant capacitors 304, the second of resonant capacitors 304', the first of freewheel diodes 303, the second of the freewheel diodes 303', the first of main diodes 107, the second of main diodes 107' and current source 312, wherein the serial branch formed the first of auxiliary diodes 108 and the second of auxiliary diodes 108' is in parallel with a voltage source 311, and the anode of the first of auxiliary diodes 108 is connected to the negative electrode of a voltage source 311, the cathode of the second of auxiliary diodes 108' is connected to the positive electrode of voltage source 311. The first of auxiliary switches 301 is in parallel with the second of the auxiliary diodes 108', and the second of auxiliary switches 301' is connected in parallel to the first of auxiliary diodes 108. The serial branch formed by the first of freewheel diodes 303 and the first of resonant inductors 105 is in parallel with the second of auxiliary diodes 108', wherein the cathode of the first of freewheel diodes 303 is connected to the cathode of the second of auxiliary diodes 108'. The serial branch formed by the second of freewheel diodes 303' and the second of resonant inductors 105' is in parallel with the first of auxiliary diodes 108, wherein the anode of the second of freewheel diodes 303' is connected to the anode of the first of auxiliary diodes 108, both the first of main switches 302 and the first of resonant capacitors 304 are connected in parallel to the first of freewheel diodes 303. Both the second of main switch 302' and the second of resonant capacitors 304' are connected in parallel to the second of freewheel diodes 303'. The anode of the first of main diodes 107 is connected to the negative electrode of voltage source 311, and the cathode of the first of main diodes 107 is connected to the anode of the first of freewheel diodes 303. The anode of the second of main diodes 107' is connected to the cathode of the second of freewheel diodes 303', and the cathode of the second of main diodes 107' is connected to the positive electrode of voltage source 311. One end of current source 312 is connected to the cathode of the first of auxiliary diodes 108, and the other end of current source 312 is connected to the other arm in the bridge circuit.

Figure 3D:
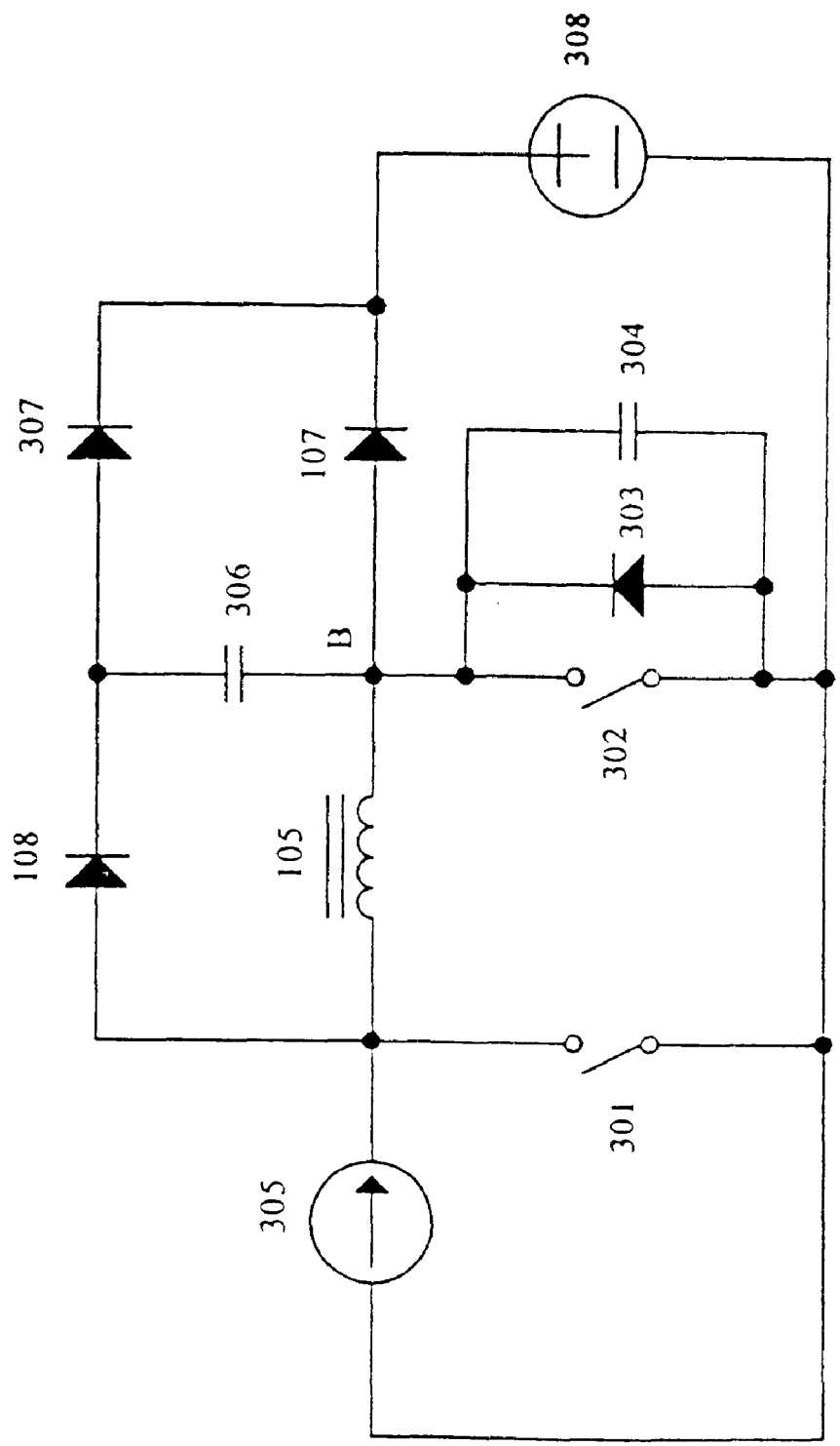

FIG. 3D is a topological structure of the further improved invention applied in a BOOST circuit, in the scheme illustrated in FIG. 3A, two components, i.e. lossless snubber capacitor 306 and lossless snubber diode 307 are added in the topological structure, wherein, a serial branch formed lossless snubber diode 307 and auxiliary diode 108 is in parallel with a serial branch formed by resonant inductor 105 and main diode 107; lossless snubber capacitor 306 is connected across the two connecting points of the above two branches.

The topological circuit includes current source 305, auxiliary switch 301, auxiliary diode 108, lossless snubber capacitor 306, lossless snubber diode 307, resonant inductor 105, resonant capacitor 304, main switch 302, main diode 107, freewheel diode 303, and first voltage source 308, wherein a serial loop is formed in series by current source 305, resonant inductor 105, main diode 107 and firsts voltage source 308, and the positive electrode of a current source 305 is connected to one end of resonant inductor 105, the other end of resonant inductor 105 is connected to the anode of main diode 107, and the cathode of main diode 107 is connected to the positive electrode of first voltage source 308. Auxiliary switch 301 is in parallel with current source 305. The anode of freewheel diode 303 is connected to the negative electrode of first voltage source 308, and the cathode of freewheel diode 303 is connected to the anode of main diode 107. Both main switch 302 and resonant capacitor 304 are in parallel with freewheel diode 303. The anode of auxiliary diode 108 is connected to the positive electrode of current source 305, the cathode of auxiliary diode 108 is connected to the anode of lossless snubber diode 307, the cathode of lossless snubber diode 307 is connected to the cathode of main diode 107, and lossless snubber capacitor 306 is connected across the anode of lossless snubber diode 307 and the anode of main diode 107.

Similar to the topological structure of a circuit shown in FIG. 3D, the application of the invention in a BUCK circuit can also be further improved, wherein another lossless snubber diode 307 is also included between auxiliary diode 108 and current source 310, and the cathode of lossless snubber diode 307 is connected to the anode of auxiliary diode 108, and the anode of lossless snubber diode 307 is connected to the positive electrode of current source 310; and another lossless snubber capacitor 306 is also included, one end of the capacitor is connected to the cathode of main diode 107, the other end of the capacitor is connected to the connecting point of auxiliary diode 108 and lossless snubber diode 307.

Figure 5:
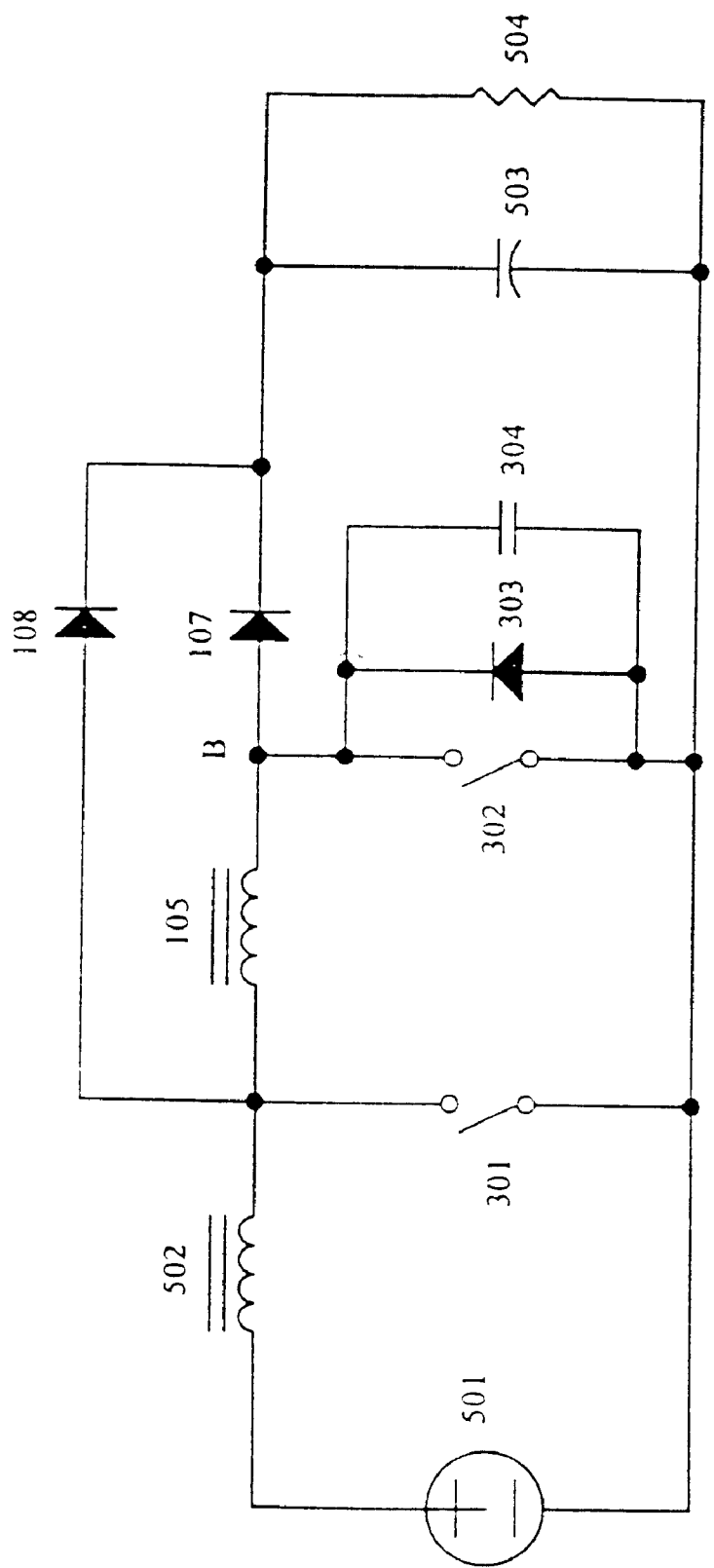
FIG. 5 is a schematic diagram of an application in a BOOST circuit of the present invention.

FIG. 5 is a schematic diagram of an application of the invention in a BOOST circuit. Its core is a topological structure shown in FIG. 3A. Its circuit comprises voltage source 501, energy-storage inductor 502, main switch 302, freewheel diode 303, resonant capacitor 304, resonant inductor 105, auxiliary switch 301, main diode 107, auxiliary diode 108, output filter capacitor 503, and load resistor 504, wherein the current source in FIG. 3A is replaced by voltage source 501 and energy-storage inductor 502, and output filter capacitor 503 together with a load resistor 504 serve as an output circuit of the circuit.

FIG. 4 shows the working procedures of the circuit shown in FIG. 5. FIG. 4A shows the waveform of gate driving signal voltage $V_1$ of auxiliary switch 106; FIG. 4B shows the waveform of gate driving signal voltage $V_2$ of main switch 302; FIG. 4C shows the waveform of current $I_{lr}$ in resonant inductor 105; FIG. 4D shows the waveform of current $I_{Daux}$ of auxiliary diode 108; FIG. 4B shows the waveform of current $I_{Dmain}$ of main diode 107; FIG. 4F shows the waveform of the voltage $V_{Qmain}$ main switch 302. It can be seen from the above drawings:

At the moment t=t0, auxiliary switch is turned on, since the currents of energy storage inductor 502 and resonant inductor 105 can not change abruptly, therefore at the instant of turning on the current of auxiliary switch 301 is zero. Thus, the circuit realized zero current turn-on for auxiliary switch 301 by means of resonant inductor 105;

Starting from the moment t0, the current of resonant inductor 105, i.e. the current on main diode 107, decreases gradually, and at the moment t=t1 reduces to zero, thereby realizing a soft turn-off of main diode 107 by utilizing resonant inductor 105;

After the soft turn-off of main diode 107, resonant inductor 105 will resonate with resonant capacitor 304 as shown in FIG. 4F, at the moment t=t2, the voltage on resonant capacitor 304 will resonate to zero, i.e. the voltage $V_{Qmain}$ of main switch 302 is also zero, and afterwards freewheel diode 303 starts turn-on;

During the freewheeling period of freewheel diode 303, at the moment t=t3, main switch 302 is turned on, at the same time auxiliary switch 301 is turned off, so that zero voltage turn-on of main switch 302 is realized. At this time, the current in energy storage inductor 502 plus the resonant current in a resonant inductor 105 flows to output filter capacitor 503 through auxiliary diode 108, since the voltage on both ends of auxiliary switch 301 is limited by the voltage on output filter capacitor 503 through auxiliary diode 108, thereby a voltage clamping is realized when auxiliary switch 301 is turned off;

At the moment t=t4, when the current in a resonant inductor 105 inverts and gradually increases to the current value of energy-storage inductor 502, the current of auxiliary diode 108 reduces gradually to zero, thereby a soft turn-off of auxiliary diode 108 is realized;

At the moment t=t5, main switch 302 is turned off, and a zero voltage turn-off of main switch 302 is realized by resonant capacitor 304 in parallel with main switch 302;

At the moment t=t6, the voltage of resonant capacitor 304 rises to a voltage as that of output filter capacitor 503, the turn-on of main diode 107 limits the voltage overshoot of the main switch via a voltage clamping circuit formed by main diode 107 and output filter capacitor 503, as shown in FIG. 4F;

At the moment t=t7, auxiliary switch 301 is turned on again, the above procedures are periodically repeated.

It can be seen from the above, the invention has solved both the problem of non-zero current turn-on of auxiliary switch 301, and at the same time the problem of hard turn-off of auxiliary diode 108.

Figure 6:
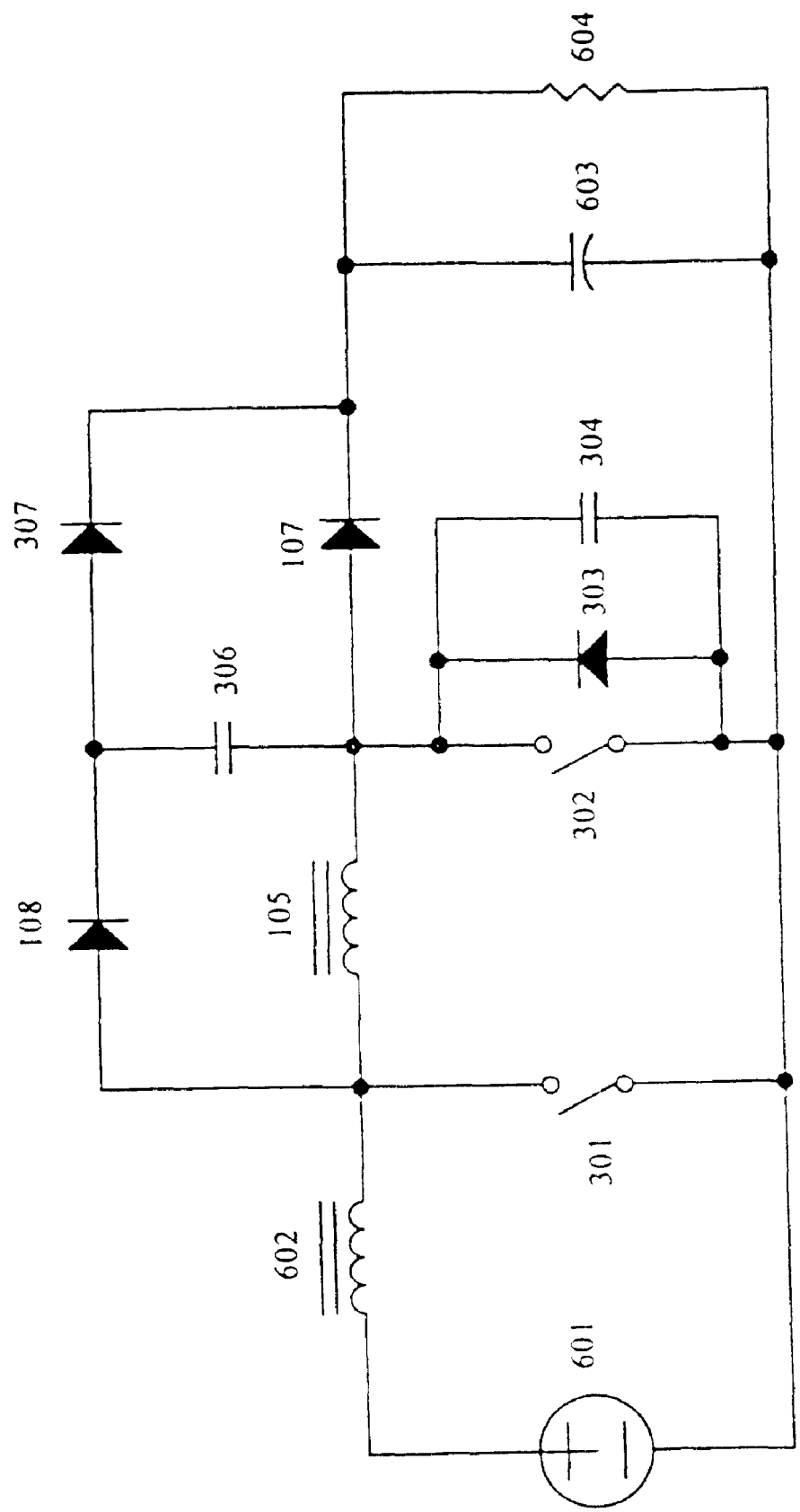
FIG. 6 is a schematic diagram of an application in a BOOST circuit of the present further improved invention.

The difference between soft switching circuit shown in FIG. 6 and the circuit shown in FIG. 5 lies in that a lossless snubber diode 307 and a lossless snubber capacitor 306 are added, i.e. the circuit is an application of the topological structure in FIG. 3D. Its topological circuit comprises a second voltage source 601, energy-storage inductor 602, main switch 302, freewheel diode 303, resonant capacitor 304, resonant inductor 105, auxiliary switch 301, main diode 107, auxiliary diode 108, lossless snubber diode 307, lossless snubber capacitor 306, output filter capacitor 603 and load resistor 604, wherein the current source (305) in FIG. 3D is replaced by a serial circuit formed via the second voltage source (601) in series with the energy-storage inductor (602), and the first voltage source (308) in FIG. 3D is replaced by a parallel circuit formed via the output filter capacitor (603) in parallel with the load resistor (604).

The working procedures of the circuit shown in FIG. 6 and that of the circuit shown in FIG. 5 differ in:

1. At the moment t=t3 when auxiliary switch 301 is turned off, the current in energy-storage inductor 602 plus the resonant current in resonant inductor 105 flows to lossless snubber capacitor 306 through auxiliary diode 108, thereby, a zero voltage turn-off of auxiliary switch 301 is realized;

2. At the moment t=t5 when main switch 302 is turned off, the energy stored in lossless snubber capacitor 306 feeds to output filter capacitor 603 via a lossless snubber diode 307.

Figure 7:
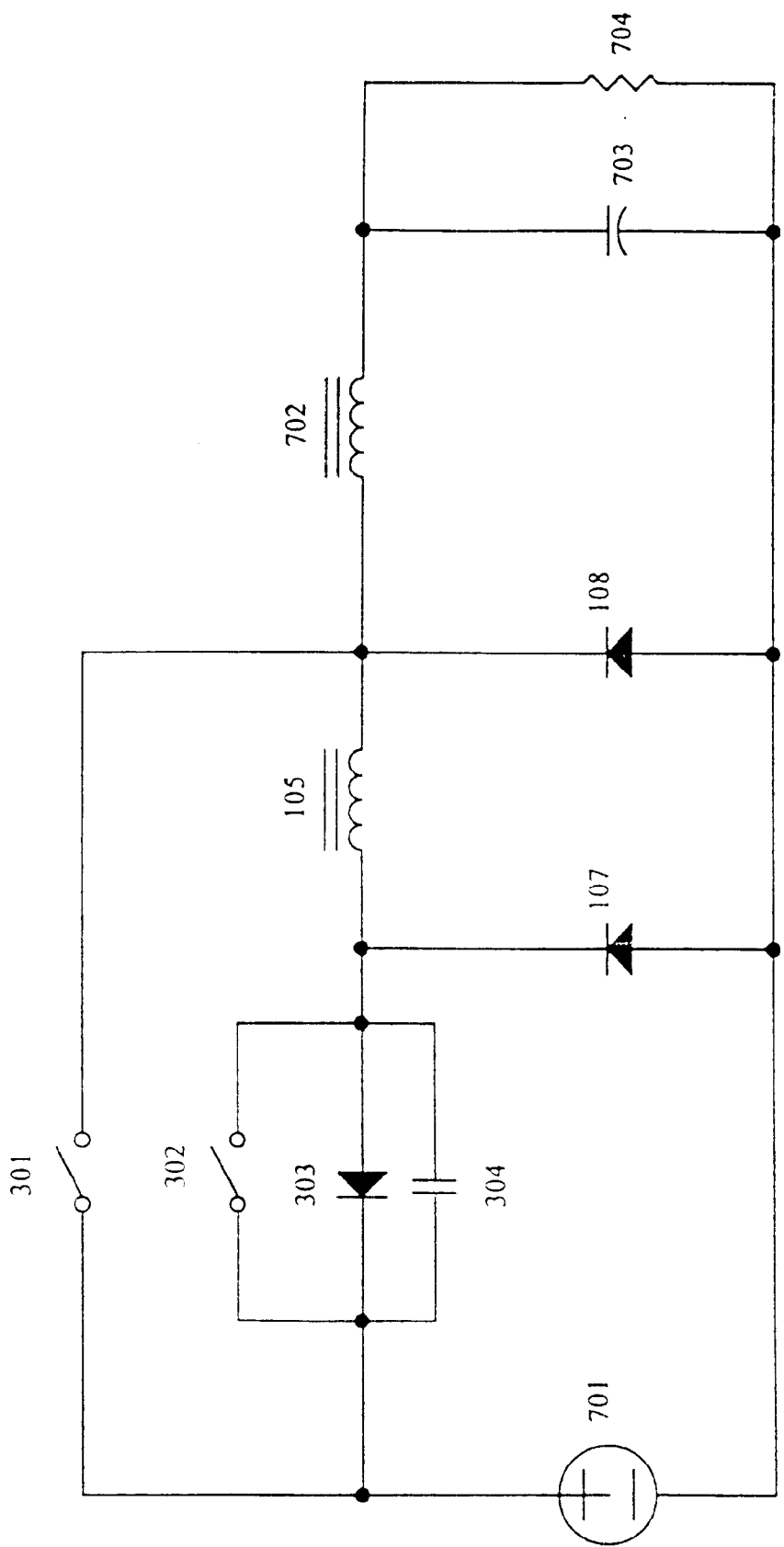
FIG. 7 is a schematic diagram of an application in a BUCK circuit of the present invention.

The soft switching topological circuit shown in FIG. 7 is an application of the invention in a BUCK circuit. Its core is the topological structure shown in FIG. 3B. Its circuit comprises a voltage source 701, an energy-storage inductor 702, an auxiliary switch 301, a main switch 302, a freewheel diode 303, a resonant capacitor 304, a resonant inductor 105, a main diode 107, an auxiliary diode 108, an output filter capacitor 703, and a load resistor 704. The positive electrode of the voltage source 701 is connected to the cathode of the freewheel diode 303, the negative electrode of the voltage source 701 is connected to the anode of the main diode 107; the current source 310 in FIG. 3B is a branch constituted by the electrolytic capacitor 703 in series with the energy-storage inductor 702, one end of the branch is connected to the negative electrode of the voltage source 701 and is connected to the anode of the main diode 107, the other end of the branch is connected to the connecting point of the resonant inductor 105 and the auxiliary switch 301. The load resistor 704 can be added in parallel with the electrolytic capacitor 703. Its idea of realizing ZVT is the same as the ZVT-BOOST circuit shown in FIG. 5, and the specific working procedures are as follows;

When auxiliary switch 301 is turned on, a soft turn-off of main diode 107 and a zero current turn-on of auxiliary switch 301 are realized by means of resonant inductor 105;

After the soft turn-off of main diode 107, resonant capacitor 304 resonates with resonant inductor 105, when the voltage drop on resonant capacitor 304 is zero, freewheel diode 303 starts turn on. During the turn-on period of freewheel diode 303, main switch 302 is turned on, thereby realizing zero voltage turn-on of main switch 302;

At the same time as main switch 302 is turned on an auxiliary switch 301 is turned off, at this moment, auxiliary diode 108 is turned on to provide freewheel for energy-storage inductor 702, and resonant inductor 105;

After a main switch 302 is turned on, the current in a resonant inductor 105 rises gradually, so the soft turn-off of auxiliary diode 108 is realized;

When main switch 302 is turned off, resonant capacitor 304 in parallel with main switch 302 realizes a zero voltage turn-off of the main switch;

When the voltage of resonant capacitor 304 rises to the same level as for the voltage source 701, main diode 107 is turned on.

At a certain time afterwards, auxiliary switch is turned on again, and repeats periodically the above procedures.

Figure 8:
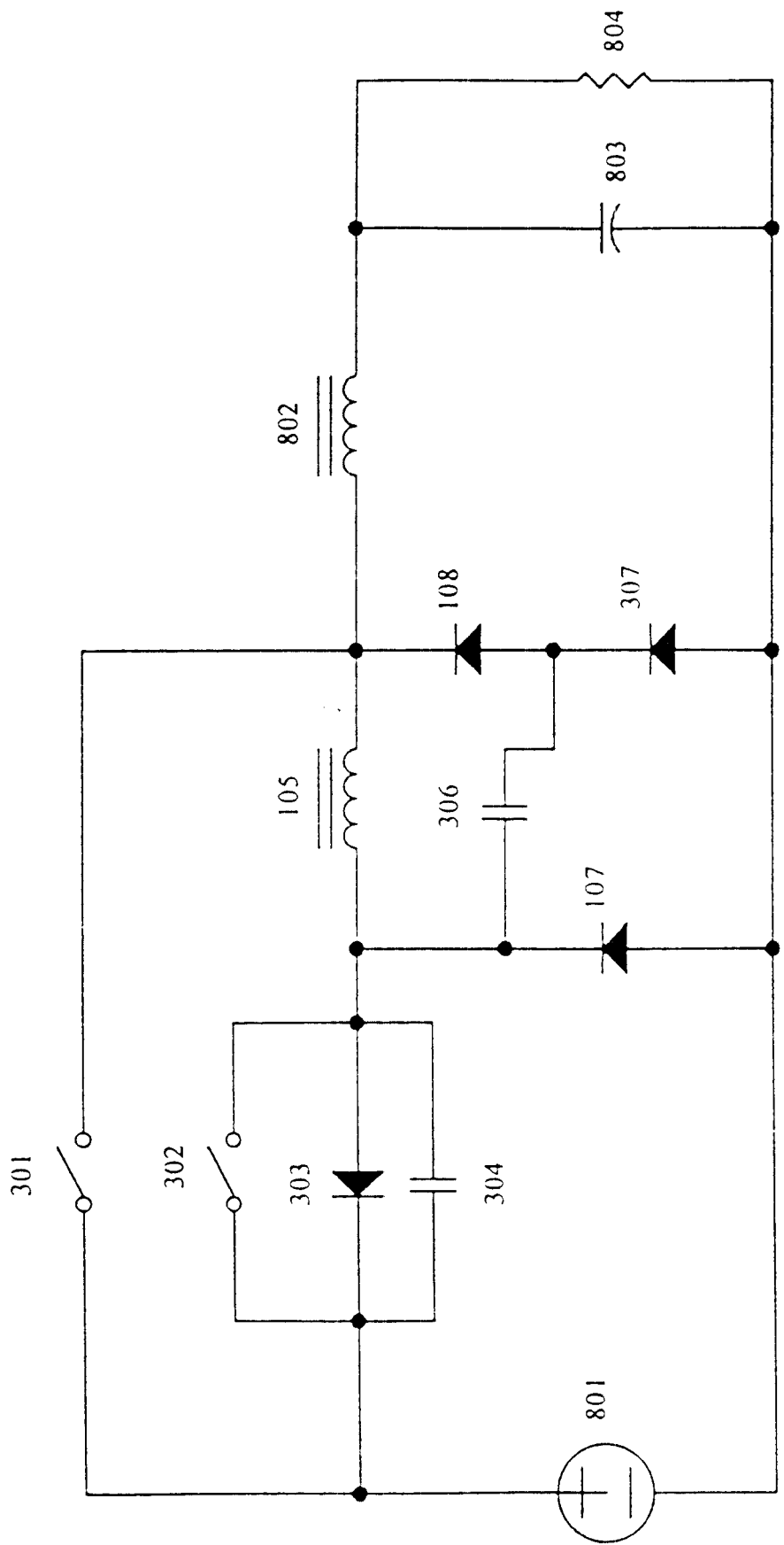
FIG. 8 is a schematic diagram of an application in a BUCK circuit of the present further improved invention.

Application of the further improved invention in a BUCK circuit is seen in FIG. 8. The circuit is based on the circuit shown in FIG. 7 with an addition of lossless snubber diode 307 and lossless snubber capacitor 306. The circuit comprises a voltage source 801, an auxiliary switch 301, a main switch 302, a freewheel diode 303, a resonant capacitor 304, a resonant inductor 105, a main diode 107, an auxiliary diode 108, a lossless snubber diode 307, a lossless snubber capacitor 306, an energy-storage inductor 802, an output filter capacitor 803 and a load resistor 804.

The difference of the working procedure of the circuit shown in FIG. 8 from that in FIG. 7 lies in:

1. when auxiliary switch 301 is turned off, a freewheel is providing to energy-storage inductor 802 via main switch 302, lossless snubber capacitor 306, and auxiliary diode 108, meanwhile lossless snubber capacitor 306 and auxiliary diode 108 also provide freewheel to resonant inductor 105, and zero voltage turn-off of auxiliary switch 301 is realized via charging lossless snubber capacitor 306;

2. when main switch 302 is off, energy stored in lossless snubber capacitor 306 feeds energy to resonant inductor 105 and energy-storage inductor 802 via lossless snubber diode 307.

Figure 9:
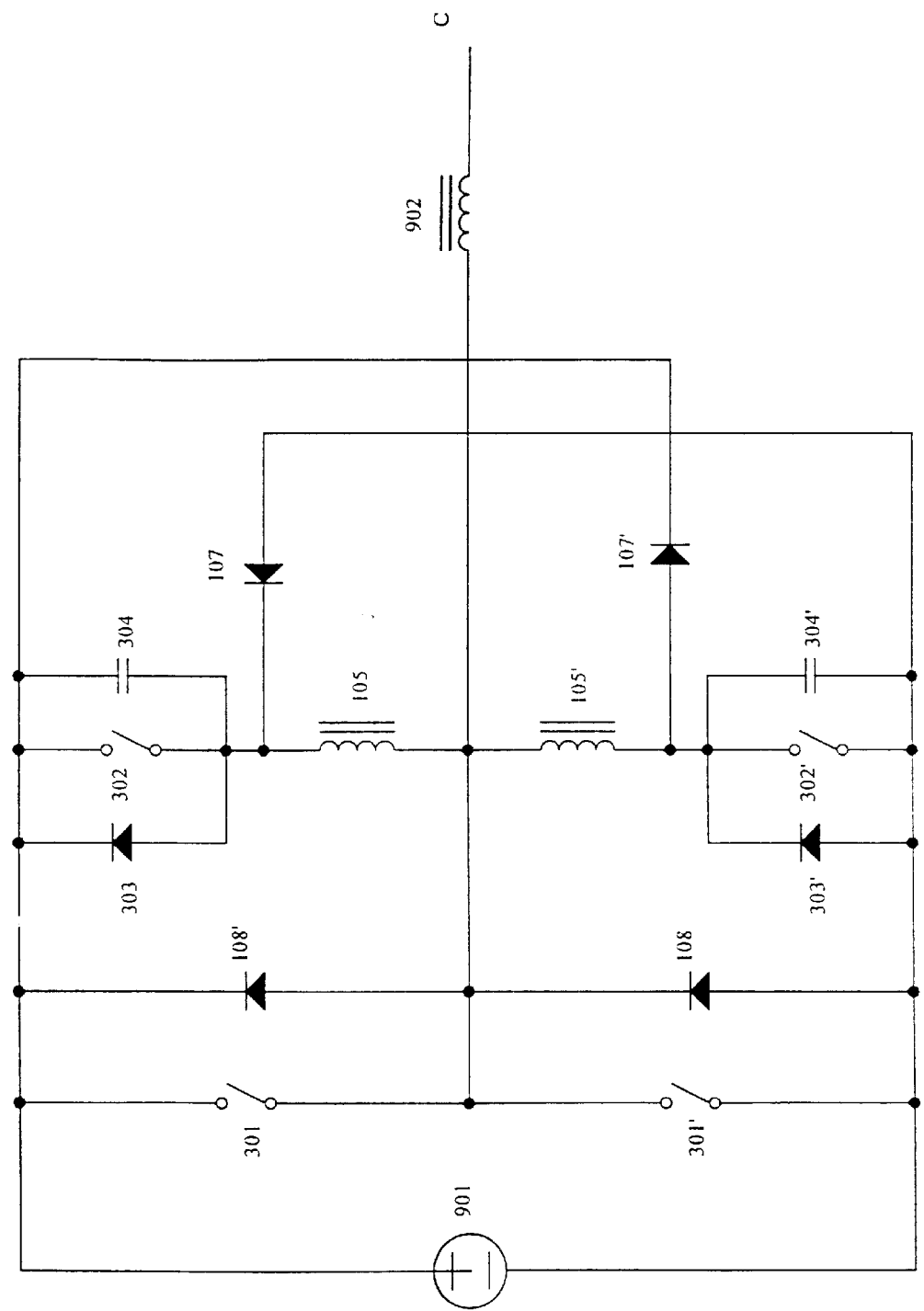
FIG. 9 is a schematic diagram of application in a bridge circuit of the present invention.

Application of the invention in a bridge circuit is shown in FIG. 9. The circuit shown in FIG. 9 is a schematic diagram of an arm in a bridge circuit, its core is the topological structure shown in FIG. 3C. The current source 312 in FIG. 3C is replaced by an inductor 902. The circuit comprises a voltage source 901, the first auxiliary switches 301, the second of auxiliary switches 301', the first of main switches 302, the second of main switches 302', the first of freewheel diodes 303, the second freewheel diodes 303', the first resonant capacitors 304, the second of resonant capacitors 304', the first of resonant inductors 105, the second of resonant inductors 105', the first of main diodes 107, the second of main diodes 107', the first of auxiliary diodes 108, the second of auxiliary diodes 108', the inductor 902, wherein voltage source 901, the first of main switches 302, the first of resonant inductors 105, the inductor 902, the first of resonant capacitors 304, the first of freewheel diodes 303, the first of auxiliary switches 301 and the first of auxiliary diodes 108 form a ZVT-BUCK circuit, inductor 902, the second of resonant inductors 105', the second of main diodes 107', voltage source 901, the second of main switches 302', the second of resonant capacitors 304', the second of freewheel diodes 303', the second of auxiliary switches 301' and the second of auxiliary diodes 108' form a ZVT-BOOST circuit, two circuits share an inductor 902 and a voltage source 901, forming an arm in the bridge circuit, the other end(C) of inductor 902 is connected to other arms of the bridge.

Figure 10:
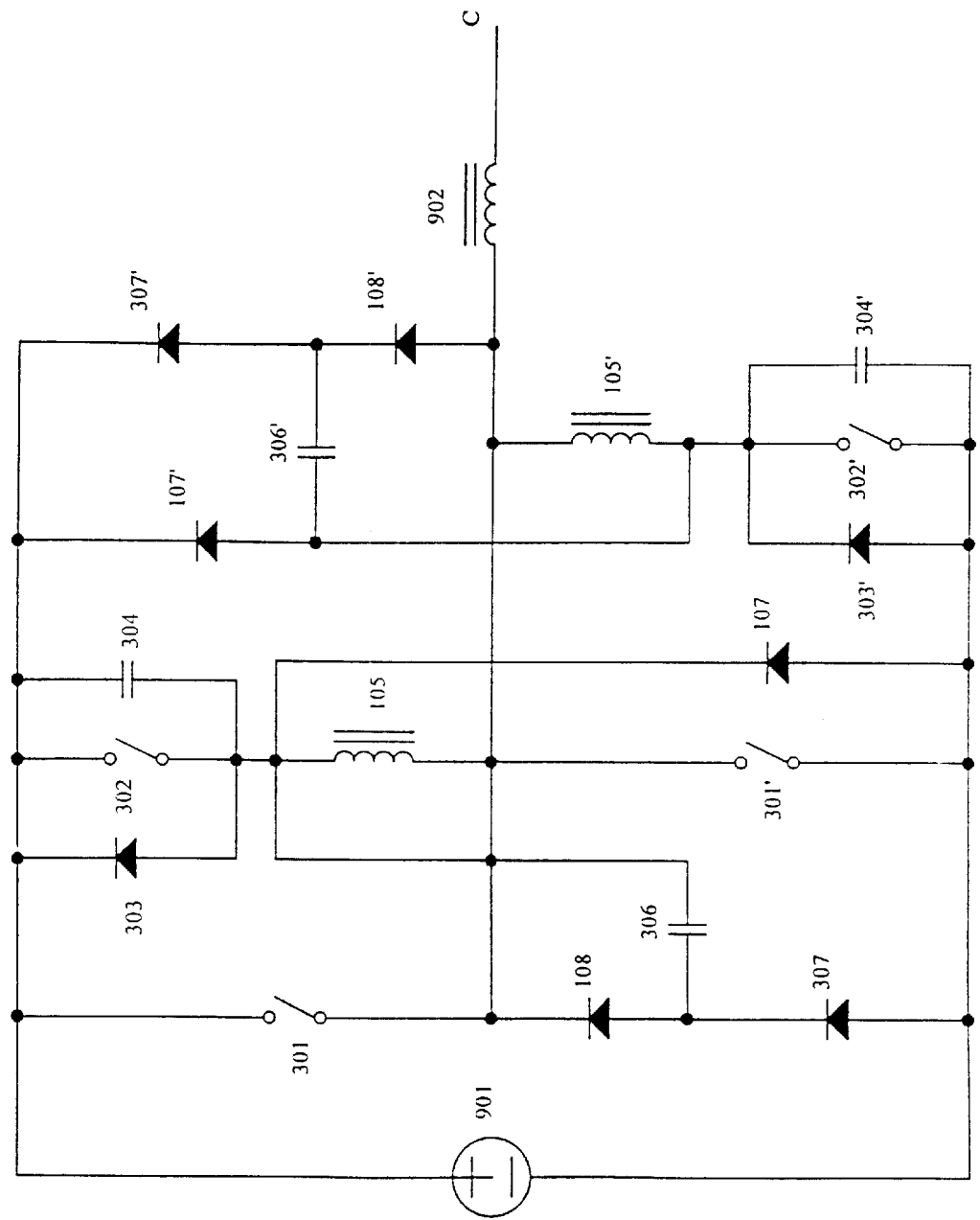
FIG. 10 is a schematic diagram of an application in a bridge circuit of the present further improved invention.

The circuit shown in FIG. 10 is a schematic diagram of an application of the further improved invention in an arm of the bridge circuit. The circuit is based on FIG. 9 with an addition of The first of lossless snubber capacitors 306, the second of lossless snubber capacitors 306', the first of lossless snubber diodes 307 and the second of lossless snubber diodes 307', wherein the first of lossless snubber capacitors 306 and the first of lossless snubber diodes 307 are added to the ZVT-BUCK circuit shown in FIG. 9 to form an improved ZVT-BUCK circuit; the second of lossless snubber capacitors 306' and the second of lossless snubber diodes 307' are added to the ZVT-BOOST circuit shown in FIG. 9 to form an improved ZVT-BOOST circuit. The first of the lossless snubber diodes 307 is added between the first of the auxiliary diodes 108 and the voltage source 901, the anode of the first of the lossless snubber diodes 307 is connected to the negative electrode of the voltage source 901, its cathode is connected to the anode of the first of the auxiliary diodes 108. The first of the lossless snubber diodes 306 is also included, its one end is connected to the connecting point of the first of the auxiliary diodes 108 and the first of the lossless snubber diodes 307, its other end is connected to the connecting point of the first of the resonant inductors 105 and the first of the main switches 302. The second of the lossless snubber diodes 307' is added between the second of the auxiliary diodes 108' and the voltage source 901, the cathode of the second of the lossless snubber diodes 307' is connected to the positive electrode of the voltage source 901, its anode is connected to the cathode of the second of the auxiliary diodes 108'. The second of the lossless snubber capacitors 306' is included, its one end is connected to the connecting point of the second of the auxiliary diodes 108' and the second of the lossless snubber diodes 307' , its other end is connected to the connecting point of the second of the resonant inductors 105' and the second of the main switches 302'.

Figure 11:
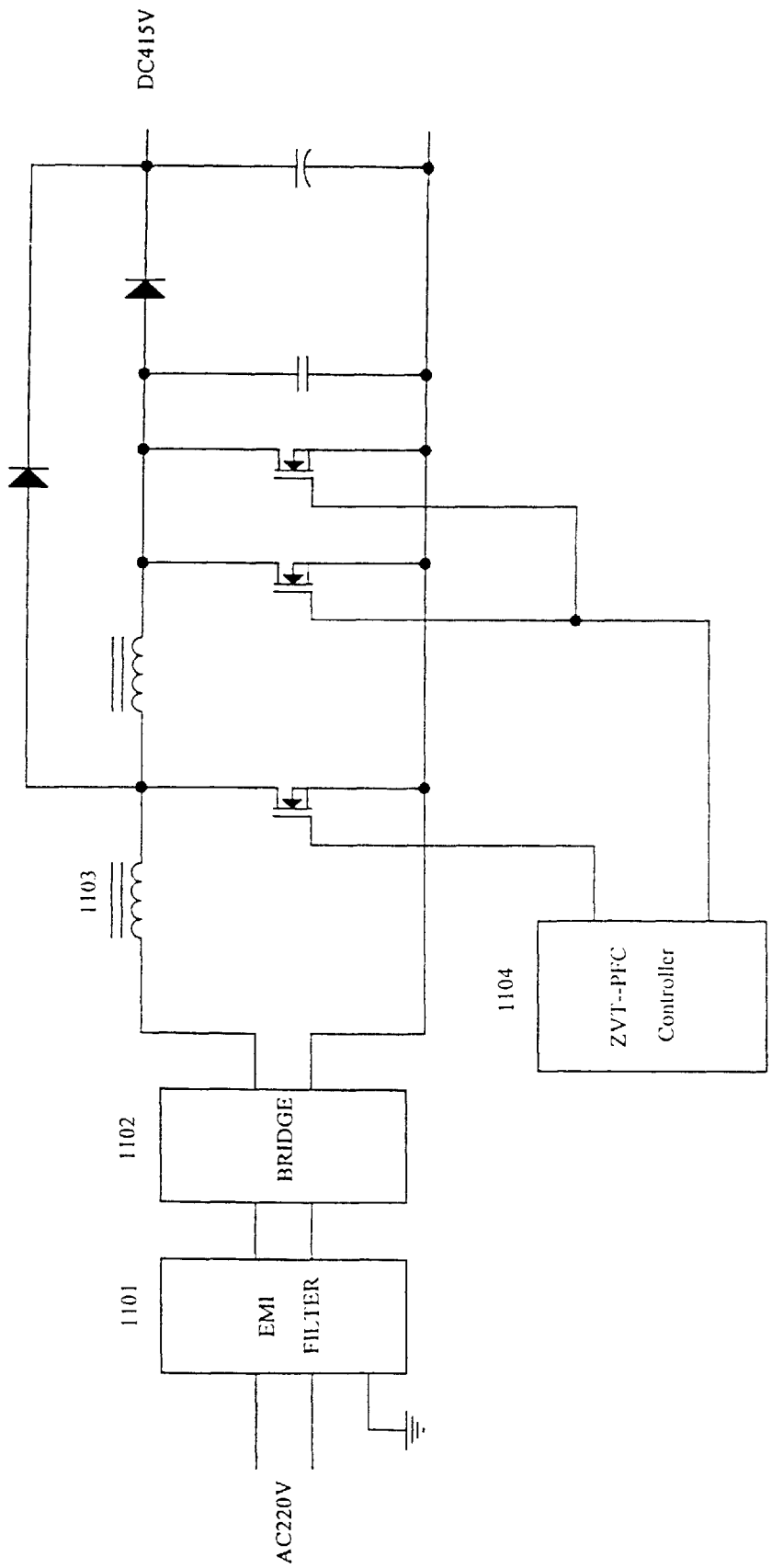
FIG. 11 is an application embodiment in a 2 kW Power Factor Correcting (PFC) circuit of the present invention.

A circuit of the invention applied in 2 kW Power Factor Correction (PFC) is shown in FIG. 11. It is a ZVT-BOOST circuit, its input is 220 V single-phase AC voltage, after being filtered by a filter network 1101, and after being rectified by rectifying bridge 1002, it is sent to the main circuit as a voltage source; the inductance value of energy-storage inductor 1103 in the main loop is set at 300 $\mu$H, the value of resonant inductor 105 is set at 20 $\mu$H, main diode 107 comprises DSEI 30-06 A (600 V, 37 A), auxiliary diode 108 comprises DSEI 12-06 A (600 V, 14A), main switch 302 comprises two MOSFETs with model number of IXFH 32N50 (500 V, 32 A) in parallel, while auxiliary switch 301 comprise a MOSFET with a model number of IXFH 20N60 (600 V, 20 A), the driving control circuit of main switch 302 and auxiliary switch 301 comprises a special ZVT-PFC control chip with model number of UC 3855BN, the resonant capacitor comprise a 4n7 non-inductive capacitor. The output filter capacitor comprises three electrolytic capacitors of 330 $\mu$F/450 V in parallel. This circuit can provide a direct current with an output voltage of 450 V, and a power of 2 kW achieving a satisfactory result with efficiency as high as 97.3%.

Figure 12:
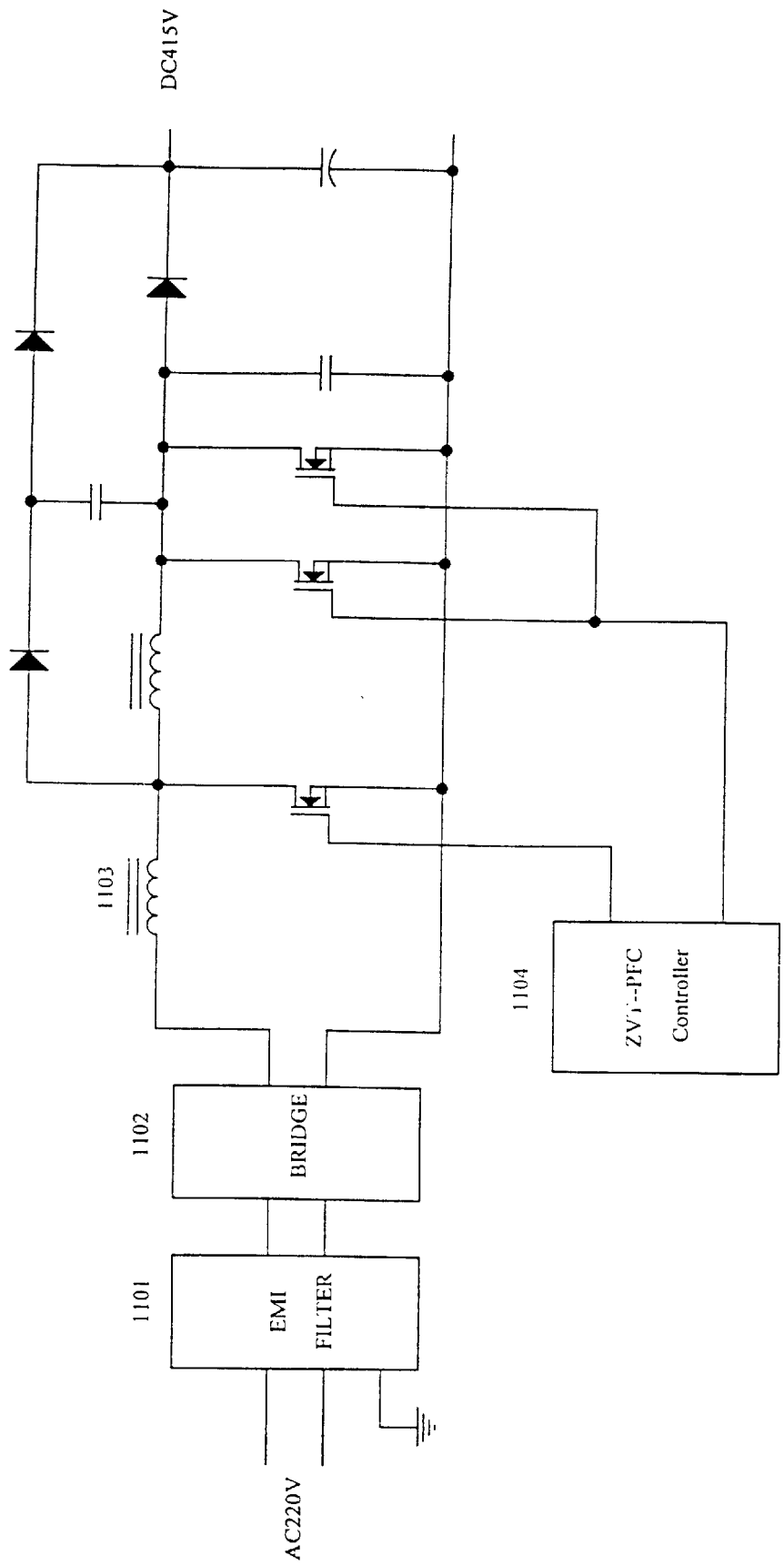
FIG. 12 is an application embodiment in a 2 kW Power Factor Correcting (PFC) circuit of the present further improved invention.

An application of the further improved invention in a 2 KW PFC circuit is shown as FIG. 12. The values set for other components and devices are basically the same as in FIG. 11, while the value of the additional lossless snubber diode is set at DSEI 12–60 A (600 V, 14 A), and the lossless snubber capacitor is set at a 6n6 non-inductive capacitance.

The efficiency of application of the further improved invention in a 2 KW PFC circuit reached as high as 97.5%.

Although the main technical features and advantages of the invention have been described in detail with the above preferred embodiments, obviously the protection scope of the invention is not limited to the above embodiments, but include a variety of obviously alternative schemes in accordance with the above inventive conception.

What is claimed is:

1. A soft switching topological circuit in a power converter circuit, comprising:
   a current source, a main switch, a main diode, an auxiliary switch, an auxiliary diode, a resonant inductor, a resonant capacitor, a freewheel diode, and a first voltage source, wherein the resonant inductor and the resonant capacitor form a resonant circuit, wherein
      the current source, the resonant inductor, the main diode, and the first voltage source are connected sequentially to form a serial loop,
      the positive electrode of the current source is connected to one end of the resonant inductor, the other end of the resonant inductor is connected to the anode of the main diode, the cathode of the main diode is connected to the positive electrode of the first voltage source,
      the auxiliary switch is connected in parallel to the current source,
      the anode of the auxiliary diode is connected to the positive electrode of the current source, the cathode of the auxiliary diode is connected to the positive electrode of the first voltage source,
      the main switch is connected across the anode of the main diode and the negative electrode of the first voltage source,
      the resonant capacitor and the freewheel diode are in parallel with the main switch, and the cathode of the freewheel diode is connected to the anode of the main diode, wherein
   said main switch and said auxiliary switch are turned on or off periodically, said main switch being turned on at the same time as said auxiliary switch is turned off and said auxiliary switch being turned on only after said main switch is turned off for a predetermined period of time.

2. A soft switching topological circuit according to claim 1, wherein
   a first lossless snubber diode connected between the first auxiliary diode and a voltage source, the anode of the first lossless snubber diode is connected to the negative electrode of the voltage source, a cathode of which is connected to the anode of the first auxiliary diode;
   a first lossless snubber diode having one end connected to a connecting point of the first auxiliary diode and the first lossless snubber diode, another end connected to the connecting point of the first resonant inductor and the first main switch;
   a second lossless snubber is connected between the second auxiliary diode and the voltage source, the cathode of the second lossless snubber diode is connected to a positive electrode of the voltage source, an anode of which is connected to the cathode of the second auxiliary diode;
   a second lossless snubber capacitor, one end of which is connected to a connecting point of the second auxiliary diode and the second lossless snubber diode, another end of which is connected to a connecting point of the second resonant inductor and the second main switch.

3. A soft switching topological circuit according to claim 1, further comprising a lossless snubber diode between the auxiliary diode and the first voltage source, wherein the anode of the lossless snubber diode is connected to the cathode of the auxiliary diode, and the cathode of the lossless snubber diode is connected to the positive electrode of the first voltage source; and
   a lossless snubber capacitor, one end of the capacitor is connected to the anode of the main diode, the other end of the capacitor is connected to the connecting point of the auxiliary diode and the lossless snubber diode.

4. A soft switching topological circuit according to claim 3, wherein said current source is replaced by a serial circuit formed via a second voltage source in series with an energy-storage inductor, and said first voltage source is replaced by a parallel circuit formed via an output filter capacitor in parallel with a load resistor.

5. A soft switching topological circuit according to claim 1, wherein said voltage source is an electrolytic capacitor, a positive electrode of which is connected to the cathode of said main diode, a negative electrode of which is connected to the anode of said freewheel diode; said current source is a branch formed via a voltage source in series with an energy storage inductor, one end of the branch is connected to the negative electrode of the electrolytic capacitor and is connected to the anode of said freewheel diode, the other end of the branch is connected to the connecting point of said resonant inductor and said auxiliary switch.

6. A soft switching topological circuit according to claim 5, wherein the inductance of said energy storage inductor is greater than that of the resonant inductor.

7. A soft switching topological circuit according to claim 1, wherein the current capacity of said main switch is greater than that of the auxiliary switch.

8. A soft switching topological circuit according to claim 1, wherein the current capacity of said main diode is greater than that of the auxiliary diode.

9. A soft switching topological circuit according to claim 1, wherein a PFC circuit is connected to a control terminal of said main switch and a control terminal of said auxiliary switch so as to control turn-on and turn-off of said main switch and said auxiliary switch.

10. A soft switching topological circuit according to claim 1, wherein the current capacity of said main switch is greater than that of the auxiliary switch.

11. A soft switching topological circuit according to claim 1, wherein the current capacity of said main diode is greater than that of the auxiliary diode.

12. A soft switching topological circuit according to claim 1, wherein said current source is an inductor.

13. A soft switching topological circuit in a power converts circuit, comprising:
- a voltage source, a main switch, a main diode, an auxiliary switch, an auxiliary diode, a resonant inductor, a resonant capacitor, a freewheel diode and a current source, the resonant inductor and the resonant capacitor form a resonant circuit, wherein,
  - the main diode, the resonant inductor, and the current source are connected sequentially to form a serial loop, wherein the cathode of the main diode is connected to one end of the resonant inductor, the other end of the resonant inductor is connected to the negative electrode of the current source;
  - the auxiliary diode is in parallel with the current source, wherein the cathode of the auxiliary diode is connected to the negative electrode of the current source,
  - the freewheel diode and the voltage source are connected sequentially to form a serial branch which is in parallel with the main diode, wherein the anode of the freewheel diode is connected to the cathode of the main diode, and the cathode of the freewheel diode is connected to the positive electrode of the voltage source,
  - both the main switch and the resonant capacitor are in parallel with the freewheel diode,
  - the auxiliary switch is connected across the positive electrode of the voltage source and the cathode of the auxiliary diode.

14. A soft switching topological circuit according to claim 13, wherein a lossless snubber diode is included between the auxiliary diode and the current source, wherein the cathode of the lossless snubber diode is connected to the anode of the auxiliary diode, and the anode of the lossless snubber diode is connected to the positive electrode of the current source; a lossless snubber capacitor is included, one end of the capacitor is connected to the cathode of the main diode, the other end of the capacitor is connected to the connecting point between the auxiliary diode and the lossless snubber diode.

15. A soft switching topological circuit according to claim 13, wherein said voltage source is a conventional voltage source, a positive electrode of which is connected to the cathode of said freewheel diode, a negative electrode of which is connected to the anode of said main diode; said current source is a branch constituted by a electrolytic capacitor in series with the energy-storage inductor, one end of the branch is connected to the negative electrode of the voltage source and is connected to the anode of said main diode, the other end of the branch is connected to the connecting point of said resonant inductor and said auxiliary switch.

16. A soft switching topological circuit according to claim 15, wherein said current source is replaced by a branch formed via energy-storage inductor in series with the parallel circuit of an electrolytic capacitor and the load resistor.

17. A soft switching topological circuit according to any one of claims 1 or 3–5 or 13–16, wherein said freewheel diode is an inverse-parallel diode or a parasitic diode of said main switch.

18. A soft switching topological circuit according to claim 13, wherein said resonant capacitor is a parasitic capacitor of said main switch.

19. A soft switching topological circuit according to claim 13, wherein said main switch and said auxiliary switch are configured to be turned on or off periodically, said main switch being turned on at the same time as said auxiliary switch is turned off and said auxiliary switch being turned on only after said main switch is turned off for a predetermined period of time.

20. A soft switching topological circuit according to claim 13, wherein the current capacity of said main switch is greater than that of the auxiliary switch.

21. A soft switching topological circuit according to claim 13, wherein the current capacity of said main diode is greater than that of the auxiliary diode.

* * * * *